Feb. 11, 1969  G. E. KEITH ET AL  3,426,456
SCRAPER
Filed July 28, 1965  Sheet 1 of 2
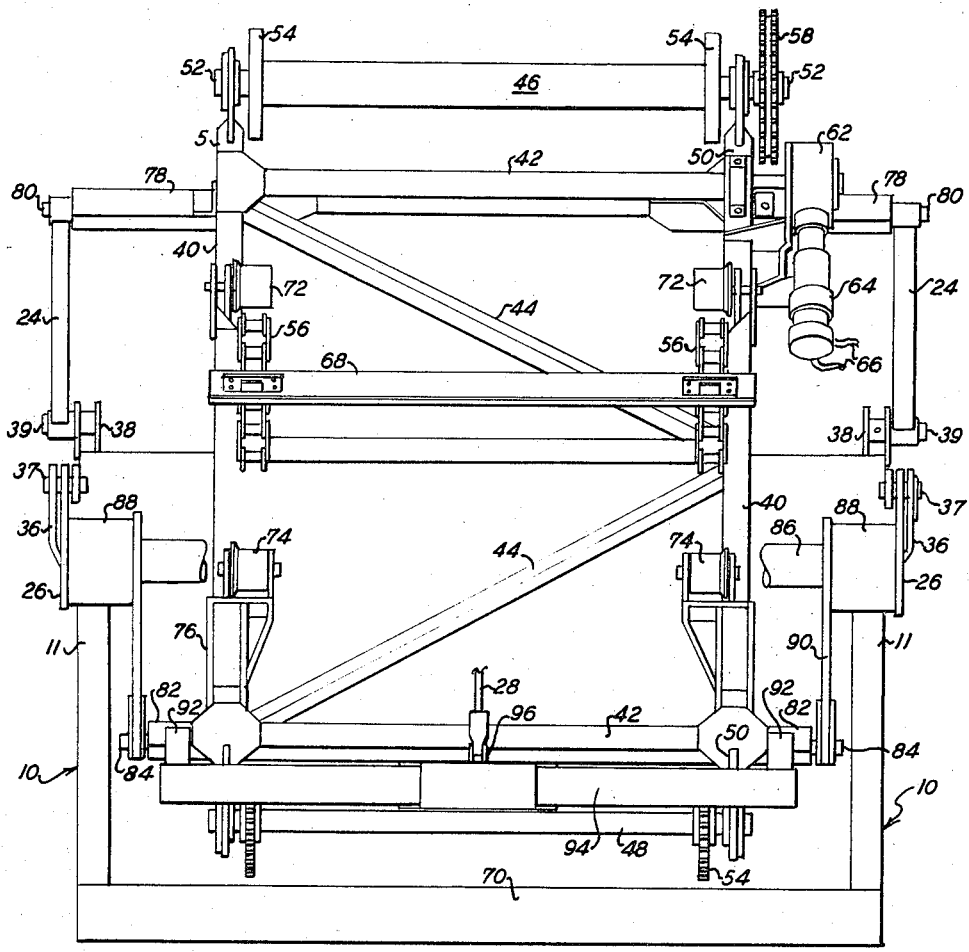
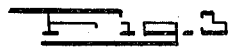
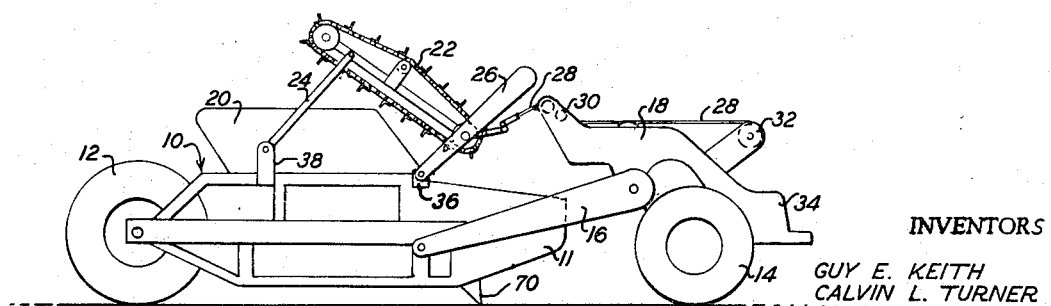
INVENTORS
GUY E. KEITH
CALVIN L. TURNER
MAX F. MARSH
BY Sol B Wiegk
ATTORNEY

United States Patent Office 3,426,456
Patented Feb. 11, 1969

3,426,456
SCRAPER
Guy E. Keith, Calvin L. Turner, and Max F. Marsh, Casper, Wyo., assignors to Western Oil Tool & Mfg. Co., Inc., Casper, Wyo., a corporation of Delaware
Filed July 28, 1965, Ser. No. 475,606
U.S. Cl. 37—8          2 Claims
Int. Cl. E02f 3/62; B60p 1/36

ABSTRACT OF THE DISCLOSURE

A scraper having a conveyor mounted diagonally upward from its open mouth for assisting in the filling of the scraper bowl during normal scraper operation, the scraper being mounted on pivot arms so that the scraper may be lifted upward and above the filled contents of the bowl to avoid interference with the ejection of the contents of the bowl through the open mouth.

---

The invention relates to the combination of an earth conveyor element supported by pivot arms in the open mouth of the bowl of an earth scraper in a manner to aid in loading the bowl and to be pivotally movable from obstructing position of the bowl mouth to allow ready unloading.

The conveyor of this invention has elongated pivot arms on each side for mounting as an accessory upon commercial earth scrapers and support of the conveyor for movement of loader and paddles diagonally upward to help loading of the scraper bowl as its open mouth is dragged along the earth. The open bowl jaw or scraper blade engages and scrapes up the earth as it is portably moved by the total assembly on wheels or tracks over the earth area being scraped. Simultaneously, the diagonal movement of the conveyor helps to load the bowl, thereby greatly improving the scraper efficiency.

An outstanding characteristic of the conveyor is in its pivotal mounting, allowing movement of the total conveyor assembly upward in a wide fixed arc raising the conveyor out of the bowl from obstructing position in the open bowl mouth to enhance unloading of the earth filled bowl and to clear any ejector mechanism that the bowl has, thus cooperating for unloading the bowl.

A further characteristic of the conveyor is that it is easily pivotally moved by the operator of the tractor to clear large boulders, thereby avoiding interference of the conveyor mounted in the open mouth of the bowl with such common obstructions, both in loading and unloading.

A further characteristic of the conveyor is that it may be fitted as an accessory to most commercially-available scrapers, replacing the movable apron closure of the bowl mouth, so that in digging conveyor-mounted position the conveyor operates to obstruct and prevent spillage from the filled bowl during transporting movement.

In prior constructions, while a conveyor mechanism had been mounted in the open mouth above the blade of a scraper bowl, these generally have interfered with unloading and ejector mechanisms so that the bowl was necessarily unloaded either by a bottom gate mechanism or by lowering of the scraper bowl and reversing the operation of loading. In either way, the conveyor mechanism awkwardly interfered with the unloading of the bowl, slowing the operation. Such ejector means either was not useful with a conveyor mounted to obstruct the open mouth of the bowl, or allowed ejection only slowly, sometimes by gravity discharge of the loose dirt in the bowl as the scraper moved in reverse and sometimes by discharge from the inclined bottom, but only slowly against the obstruction of the conveyor itself. For these reasons usual rigid ejecting devices available in scrapers have not been practically useful with a conveyor.

It is, accordingly, the primary object of this invention to provide a scraper bowl with conveyor means mounted for wide pivotal movement out of obstructive position in the scraper bowl when the earth contents of the bowl are to be removed.

A further object is to provide a conveyor means having pivot arms for mounting upon the sides of a scraper bowl as an accessory for commercial scrapers, whereby the conveyor may be pivotally moved sufficiently widely out of the bowl to avoid interference with the positive and rapid ejection of the earth contents of the bowl. A further object is to provide a combined portable scraper having an open mouth bowl for loading earth into the bowl, an ejector means in the bowl cooperative to aid in the removal of earth filled into the bowl, and a conveyor means portably mounted for firm support from the sides of the bowl in the bowl mouth to aid in loading the bowl, and pivotally movable out of obstructive position in the bowl mouth to allow the earth to be ejected.

The invention is further described in relation to the drawings wherein:

FIG. 1 is a side view of a conventional tractor-drawn earth scraper illustrating the general arrangement of elements including the pivotal mounting of a conveyor means in raised position;

FIG. 3 is an end view of the open mouth of the bowl having the mounted conveyor therein.

Figure 2:
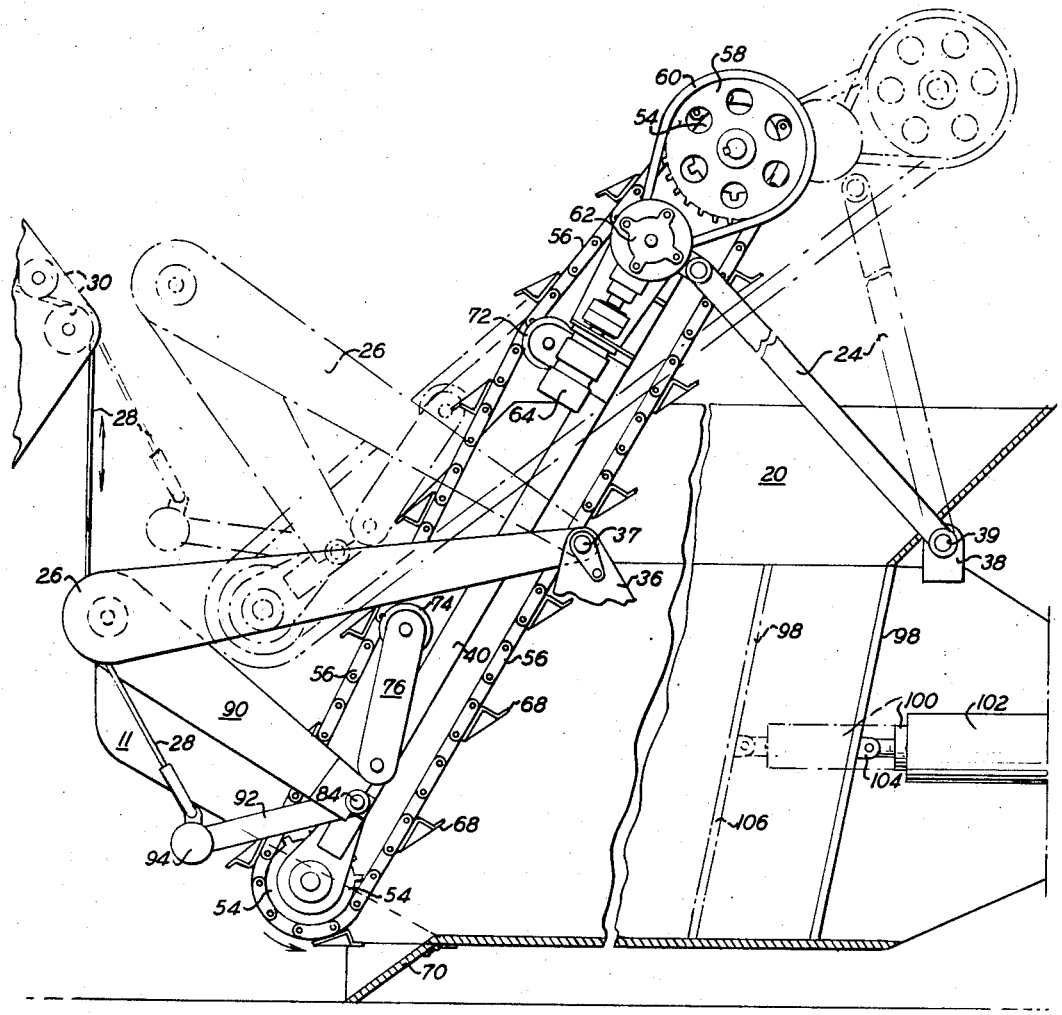
FIG. 2 illustrates the mounting of a conveyor in the open mouth of a scraper bowl and its pivotal support therein.

Referring first to FIG. 1, the device shown includes a scraper bowl 10 supported at the rear through wheels 12 and the front by rear wheels of a tractor 14 through a draft arm 16. The draft arm 16 is disengageably supported from an afterbeam 18, projecting from the tractor. The scraper bowl is supported while being raised and lowered from the draft arm 16 in a manner not shown, the construction thereof being conventional for scrapers. The bowl 10 has conventional side boards 20 fitted above and parallel to its sides to accommodate larger dirt loads without spillage. A digging conveyor 22 is shown supported from a pair of rear pivot arms 24 and a pair of forward pivot arms 26 having pivots near the upper edge of each side of bowl 10, the conveyor being raised and lowered by a wire hoist line 28 secured between a projection 94 from the lower end of the conveyor frame and entrained at its upper end around a sheave 30 cooperating with a winding drum 32 manually controlled from the tractor 34. The pivot support positions of the conveyor 22 are selected for mounting near the top edge of the bowl 10 by suitably placing forward bracket support ear 36 and after bracket support ear 38 near the upper edge of the scraper bowl 10. These ears 36 and 38 are variably sized, depending upon the particular bowl to which the conveyor is to be affixed, longer or shorter to pivotally support the conveyor 22 balanced between the open mouth of the bowl and an arcuately raised position therefrom, clearing the mouth of the bowl as shown in FIG. 1. The center of gravity of conveyor 22 is forward of the pivots so that it will return to digging-loading position of FIGS. 2 and 3 by gravity upon release of the drawing wire 28 from the winding drum 32.

As shown in FIGS. 2 and 3, the conveyor is supported upon frame members 40 secured together by upper and lower horizontal frame members 42, diagonally stiffened by channels 44. An upper idler shaft 46 and lower idler shaft 48 are rotatably journaled in bearings in the outer ends of brackets 50 extending for support upward and downward from the corners of the frame members. Intermediate on the idler rollers 46 and 48 a pair of sprockets 54 are rotatably supported, about which are entrained conveyor chains 56. A drive sprocket 58 is keyed about the outer end 52 of the idler roller 46 and has a driving chain belt 60 entrained thereabout and about the driving spur of a reduction gearing unit 62 coupled to a fluid drive motor 64, through which is pumped power fluid through lines 66 from a pump mounted on the tractor (not shown).

Digging angles 68 are conventionally supported between the pair of chains 56 to complete the conveyor digging mechanism. In the lowered digging or scraping position of the scraper bowl, as shown in FIG. 2, the digging angle 68 cooperates with the scraper blade 70 for filling the bowl 10 with dirt in conventional manner as the conveyor is moved from between idler rollers counterclockwise, by the driving means described. The chain 56 is supported intermediately upon upper roller 72 and lower roller 74, the latter being supported upon a chain tightening arm 76 adjustable in conventional manner to bear outward against the chain 56 for tightening.

The upper frame member 42 has extensions 78 at its opposite ends to the width of the scraper bowl 10, terminating in outwardly extending pivot pins 80 upon which are journaled for pivotal movement upon the upper ends of the after pivot arms 24, the lower ends of pivot arms 24 being journaled about a pivot pin 39 parallel to and supported horizontally from after brackets 38 upon each side edge of the bowl, as described. Thus the entire upper frame and conveyor assembled thereon is pivotally supported by arms 24 between pivots 39 and 80 at each side. The lower frame member 42 has a shorter extension at its ends 82 terminating in pivot pins 84 just inside of the bowl side wall 11, dimensioned to clear the side walls 11 of the bowl in vertical movement of the conveyor. The forward pivotal arms 26 are pivotally supported near the upper side edges of the bowl about pivot pins 37 which are supported horizontally from each bracket 36 disposed as described above on the outside of the side wall of the bowl 10. The inner end of pivot arms 26 are each supported on the ends of a pivot bar 86 about which is journaled sleeves 88 each secured to an outer end of a pivot arm 26. Lower pivot arms 90 are pivotally mounted, each at its upper end to the inner end of a sleeve 88 which spaces and rotatably supports the upper end of a pivot arm 90 for pivotal movement and close to the inner side of a bowl wall 11, each being parallel. The lower ends of pivot arms 90 are each journaled about a pivot pin 84, each supported by extensions 82 from each opposite end of lower frame member 42. Each opposite extension 82 of lower frame member 42 has a bracket arm fastened thereto at one end, the pair of bracket arms 92 fastened to and supporting a horizontal elevating bar 94 between their outer ends. The bar 94 has a clevis and pin 96 pivotally securing the end of the hoisting cable 28 pivotally thereto. In operation, therefore, as the hoisting cable 28 is raised, the entire conveyor pivots upward on its dual pivot arms, forward and after arms 24 and 26 both move upward to the dotted line position, shown in FIG. 2, clearing the forward open mouth end of the bowl 10 of obstruction by the conveyor. The bowl 10 was its side portion 11 extended sufficient to form a rest for the outer end of the pivot arm 26 so that the sleeve member 88 rests upon the bowl side extension portion 11, acting as a stop therefor in the lowered digging position of the conveyor.

The scraper blade 70 can be rigid or may be pivotally supported at the bottom of the bowl, allowing adjustment of the digging angle with the lower edge of the mouth of the scraper bowl 10. The bowl 10 can be raised from the draft arm 16 or lowered to scraping position with respect to the earth, as in conventional operation of any scraper (not shown). In drawing the scraper along the surface of the ground, a mound of dirt builds up before it and the conveyor, rotated counterclockwise, digs into the loose mud or dirt, lifting and conveying it into the body of the bowl.

When the bowl is filled, it may be transported and unloaded in any manner for which the scraper has been constructed. In some constructions the bowl may be tilted with the mouth lowered and moved in reverse for unloading, and in others an ejector mechanism may be used to expel the dirt load. Such ejector mechanisms may be constructed as shown herein. For instance, an ejector blade 98 comprising a vertical wall may be fitted within the bowl body 10 operating as a back wall of the bowl during loading, which may be pushed forward by the piston 100 moved hydraulically from a hydraulic cylinder 102, the end of the piston being connected to the ejector blade 98 through a supporting bracket and pin 104. For ejecting the contents of the bowl, the hoistline 28 is wound on drum 32 to lift the conveyor upwardly upon its dual pivot arms, clearing the open mouth space of the bowl and simultaneously the ejector blade 98 is pushed forward in the bowl 10 in the direction of the dotted line position of the plate 106, pushing the dirt out of the open unobstructed end of the bowl 10. While the forward position of the ejector plate 106 is shown intermediate to the ends of the bowl, it will be understood that the plate and hydraulic piston 100 will be moved a sufficient distance to horizontally traverse the bowl 10, ejecting all of the load.

Certain modifications will occur to those skilled in the art. It is intended that the dual pivot positions of the conveyor be selected for mounting on various types of earth scraper bowls having various types of ejector mechanisms; and even upon scraper bowls which have no ejector mechanisms but which merely operate by tilting. Consequently, it will be understood that while a hydraulic piston 100 and cylinder 102 are shown for moving an ejector blade 98 horizontally through the bowl 10 for ejecting the earth therefrom, other ejector mechanisms are common in the art and may be used in this combination.

Moreover, while the scraper bowl is shown mounted upon wheels being drawn by a tractor and the pivotally supported conveyor is raised by a hoist line supported about pulleys and a winding drum on the tractor, the scraper bowl may be mounted on a forward end of a tractor and its scraping effected by pushing the open mouth forward over the earth for loading together with the pivotally mounted conveyor mechanism supported therein. In such construction the hoisting line 28 may be supported from pulleys mounted at the rear of the scraper bowl for pivotally moving the scraper out of its obstructing bowl-mouth position, whereby the bowl may be dumped in any conventional manner, such as by tilting or by moving an ejector blade to push the earth out of the open, unobstructed mouth of the scraper bowl.

Accordingly, it is intended that the above description be regarded as illustrative and not limiting except as defined in the claims appended hereto.

We claim:

1. An earth scraper mechanism comprising a portably mounted open mouth scraping bowl, a conveyor means mounted diagonally upward in the open mouth of the bowl adapted to cooperate with the bowl for filling the same with the loose dirt scraped in portable movement of said bowl, a pair of elongated pivot arms each arm pivotally connected to a side near the upper end of said conveyor, each arm pivotally connected at its other end to a side and directed toward the rear of said bowl, said rear pivot arms being sufficiently elongated upon full upward pivotal movement to move the upper end of said conveyor arcuately upward and to the rear of said bowl from an upper operative earth conveying position to a lifted position of said conveyor substantially above the height of the filled contents of said bowl, means connected to the forward end of the bowl and attached to the lower end of said conveyor providing an unobstructed open mouth for the bowl, mounting said conveyor body for upward and rearward pivotal movement on said elongated pivot arms clearing said entire conveyor body from obstructing position in the open mouth of the bowl, means for actuating said pivotal movement of said conveyor body and means for ejecting the loaded dirt in said bowl through the open, unobstructed mouth in pivotally raised position of the said conveyor.

2. A conveyor means adapted for pivotally mounting diagonally upward in earth-digging position in the open mouth of a bowl of a mobile earth scraper, said conveyor comprising endless chains mounted on a rigid conveyor frame and movably supporting earth digging elements thereon, an after-pair of elongated pivot arms each having a pivot bracket near one end for pivotal support to the upper side rearwardly of said bowl and each having pivots in its opposite end fastenable near the upper end of said conveyor, said after pivot arms being dimensioned for pivotal support of the upper end of said conveyor on one each side of said conveyor frame, and a second pair of conveyor mounting elements, each mounting element comprising two pivot arms each being pivotally connected at one end to the other, each connected pivotally at their opposite ends one end to the lower frame side of said conveyor and the other to a pivot bracket to be fastened to the upper forward end of said bowl, said second pair of conveyor mounting elements being thereby pivotally fastened and disposed near the forward end of said bowl upon assembly therewith, said forward pair of conveyor supporting elements being dimensioned to pivotally support the lower end of said conveyor in the mouth of the conveyor bowl, all of said pivot arms being dimensioned and sufficiently elongated in pivotally folded position to support said conveyor in diagonally upward earth-digging position from the open mouth of said bowl and to pivotally raise and support said conveyor in upper rearward movement of said conveyor by lifting means applied only to the lower end of said conveyor, said arms supporting said conveyor in pivotal movement of all pivot arms to a conveyor position substantially above the open mouth of said bowl at both rear and forward ends.

References Cited

UNITED STATES PATENTS

| | | | |
|---|---|---|---|
| 2,956,353 | 10/1960 | Hanner et al. | 37—8 |
| 3,296,716 | 1/1967 | Rezabek et al. | 37—8 |
| 3,331,149 | 7/1967 | Rapp | 37—8 |

FOREIGN PATENTS

| | | |
|---|---|---|
| 236,280 | 9/1960 | Australia. |

ABRAHAM G. STONE, *Primary Examiner.*

ALAN E. KOPECKI, *Assistant Examiner.*